United States Patent
Marque Pucheu

(10) Patent No.: US 7,620,184 B2
(45) Date of Patent: Nov. 17, 2009

(54) METHOD FOR TRANSMITTING ENCRYPTED DATA, ASSOCIATED DECRYPTING METHOD, DEVICE FOR CARRYING OUT SAID METHODS AND A MOBILE TERMINAL FOR THE INCORPORATION THEREOF

(75) Inventor: Gérard Marque Pucheu, Verneuil sur Seine (FR)

(73) Assignee: Eads Secure Networks, Montigney le Bretonneux (FR)

( * ) Notice: Subject to any disclaimer, the term of this patent is extended or adjusted under 35 U.S.C. 154(b) by 588 days.

(21) Appl. No.: 10/491,637

(22) PCT Filed: Jul. 21, 2003

(86) PCT No.: PCT/FR03/02302

§ 371 (c)(1),
(2), (4) Date: Apr. 2, 2004

(87) PCT Pub. No.: WO2004/014019

PCT Pub. Date: Feb. 12, 2004

(65) Prior Publication Data

US 2005/0013277 A1 Jan. 20, 2005

(30) Foreign Application Priority Data

Jul. 30, 2002 (FR) .................................. 02 09668

(51) Int. Cl.
*H04J 3/00* (2006.01)
(52) U.S. Cl. ...................................... 380/270; 370/336
(58) Field of Classification Search ................. 380/270; 370/336
See application file for complete search history.

(56) References Cited

U.S. PATENT DOCUMENTS

| | | | | |
|---|---|---|---|---|
| 4,757,536 | A | | 7/1988 | Szczutkowski et al. ........ 380/48 |
| 5,060,266 | A | * | 10/1991 | Dent .......................... 380/274 |
| 5,159,593 | A | * | 10/1992 | D'Amico et al. ............ 370/332 |
| 5,708,710 | A | * | 1/1998 | Duda .......................... 380/247 |
| 5,963,909 | A | * | 10/1999 | Warren et al. ................... 705/1 |
| 2002/0066013 | A1 | | 5/2002 | Relander et al. ............ 713/151 |

FOREIGN PATENT DOCUMENTS

EP 0 446 194 9/1991

OTHER PUBLICATIONS

International Search Report of PCT/FR03/02302 issued Jan. 14, 2004.

* cited by examiner

*Primary Examiner*—Gilberto Barron, Jr.
*Assistant Examiner*—Devin Almeida
(74) *Attorney, Agent, or Firm*—McCracken & Frank LLP

(57) ABSTRACT

A process for transmitting encrypted data through a radio transmission channel having a frame structure such that a TDMA frame comprises at least time slots of a first type forming a traffic channel and at least one time slot of a second type forming an associated signaling channel, comprises steps according to which:

a sequence of encrypted data packets is transmitted in the traffic channel on the basis of a determined time slot of the first type, whereas an associated cryptographic synchronization information cue is transmitted in the associated signaling channel inside a determined time slot of the second type, and a cryptographic synchronization delay information cue relating to the time gap between said determined time slot of the second type and said determined time slot of the first type, is also transmitted in the associated signaling channel.

29 Claims, 9 Drawing Sheets

FIG. 3a

| P1 | P2 | P3 | P4 | P5 | P6 | P7 | P8 | P9 | P10 | P11 | P12 | P13 | P14 | P15 | P16 | P17 | P18 |
|----|----|----|----|----|----|----|----|----|-----|-----|-----|-----|-----|-----|-----|-----|-----|

| T1 | T2 | T3 | T4 | T5 | T6 | T7 | T8 | T9 |
|----|----|----|----|----|----|----|----|----|

FIG. 11

| $\Delta 1_i$: | 7 | 6 | 5 | 4 | 3 | 2 | 1 | 0 |
|---|---|---|---|---|---|---|---|---|
| $\Delta 2_i$: | 15 | 13 | 11 | 9 | 6 | 4 | 2 | 0 |

FIG. 3b

| Timeslots | 1st speech frame | 2nd speech frame | 3rd speech frame |
|---|---|---|---|
| 1, 10, 19, 28 | P1 | P2 | ¼ de P3 |
| 2, 11, 20, 29 | ¾ de P3 | P4 | ½ de P5 |
| 3, 12, 21, 30 | ½ de P5 | P6 | ¾ de P7 |
| 4, 13, 22, 31 | ¼ de P7 | P8 | P9 |
| 5, 14, 23, 32 | P10 | P11 | ¼ de P12 |
| 6, 15, 24, 33 | ¾ de P12 | P13 | ½ de P14 |
| 7, 16, 25, 34 | ½ de P14 | P15 | ¾ de P16 |
| 8, 17, 26, 35 | ¼ de P16 | P17 | P18 |

METHOD FOR TRANSMITTING ENCRYPTED DATA, ASSOCIATED DECRYPTING METHOD, DEVICE FOR CARRYING OUT SAID METHODS AND A MOBILE TERMINAL FOR THE INCORPORATION THEREOF

TECHNICAL FIELD

The present invention pertains to the field of digital radiocommunication systems and, in particular, systems of TDMA type (standing for "Time Division Multiple Access"). It finds particularly advantageous applications in private systems for professional radiocommunications (or PMR systems, standing for "Professional Mobile Radio").

In general, PMR systems offer a service of end-to-end encryption of traffic data transmitted during communications. The data in question codes speech, in particular, but more generally the data in question is of any nature. The aim of the encryption is to preserve the confidentiality and the integrity of the data transmitted and to prevent the usurping of the identity of the mobile terminals belonging to the system.

The expression "end-to-end" is used to designate the fact that the encryption of the transmitted data is performed at the level of the sender terminal and that the decryption is performed at the level of the receiver terminal or of the receiver terminals. The entire link is then secure, and is so in an advantageous manner independent of the infrastructure of the system. This is unlike the case of the securing of just a portion of the link between the sender terminal and the receiver terminal, for example the air interface, for which the encryption and/or the decryption of the data takes place at certain intermediate points of the link.

BACKGROUND OF THE INVENTION

In the state of the art, mechanisms are known for encrypting/decrypting data transmitted between a sender and a receiver. The principle of such a mechanism is illustrated by the diagram of FIG. 1.

The sender comprises a cryptographic sequence generator 11, which generates a data block $SC_i$ called the cryptographic sequence, independently of the plaintext data stream, on the basis of a secret cipher key K and of an information information cue called the initialization vector $IV_i$. The cryptographic sequence $SC_i$ is such that:

$$SC_i = E_K(IV_i) \tag{1}$$

where $E_K$ designates the encryption of the information information cue $IV_i$ with the key K, according to a specified encryption algorithm.

The encryption algorithm is the same for all the mobile terminals of the system. The initialization vector $IV_i$ and the secret cipher key K are known both to the sender terminal and to the receiver terminal. The initialization vector $IV_i$ varies over time so as to avoid the same cryptographic sequence being used twice with the same key K, which would seriously weaken the security of the data transmitted. The index i refers to a current value of the initialization vector.

The sender also comprises an Exclusive-OR operator 21 which receives the cryptographic sequence $SC_i$ on a first input and a sequence $m_i$ of plaintext data on a second input, and which generates a sequence of encrypted data $c_i$ at output, so that:

$$c_i = m_i \oplus SC_i \tag{2}$$

where $\oplus$ designates the Exclusive-OR operation carried out bitwise.

The sequence $c_i$ is transmitted through the transmission channel 20.

The receiver likewise comprises a cryptographic sequence generator 12 generating, on the basis of the same initialization vector $IV_i$ and of the same secret cipher key K, a cryptographic sequence $SC_i$ identical to that generated by the generator 11 of the sender and having served for the encryption of the sequence $c_i$. Likewise, it also comprises an Exclusive-OR operator 22 which receives on a first input the cryptographic sequence $SC_i$ generated by the generator 12, which receives on a second input the encrypted data sequence $c_i$, and which restores at output the sequence $m_i$ of plaintext data, owing to the fact that:

$$c_i \oplus SC_i = m_i \oplus SC_i \oplus SC_i = m_i \tag{3}$$

In order for the end-to-end transmission of encrypted data to be correct, the sender and the receiver must perform mutually dual operations. In particular, it is therefore necessary for the receiver to know the time relation to be complied with at the input of the operator 22, between the cryptographic sequence $SC_i$ that it generates on the one hand and the encrypted data sequence $c_i$ which it receives on the other hand, so that decryption executes correctly. The name for this constraint is cryptographic synchronization.

In the envisaged type of applications, cryptographic synchronization in reality exhibits two aspects. Firstly, initial synchronization, that is to say at the start of communication. And thereafter, periodic synchronization, making it possible to alleviate any loss of cryptographic synchronization between the mobile terminals participating in the communication, and moreover allowing late entry of other mobile terminals into the communication, in the context of a group communication.

An exemplary cryptographic synchronization technique for the end-to-end encryption of a radiocommunication has already been proposed for systems of FDMA type (standing for "Frequency Division Multiple Access"). This technique is described, for example, in American U.S. Pat. No. 4,757,536. It relies on the periodic insertion, into the preamble of the speech packets or frames, of both a radio and cryptographic synchronization information information cue, allowing in particular the function of late entry into the communication. The synchronization information cue consists here of the current value of the initialization vector.

This technique has been applied without modification in systems of TDMA type such as the TETRA system (standing for "TErrestrial Trunked Radio"), where no resource had been reserved a priori for the transmission of a cryptographic synchronization information cue: the latter is transmitted from end to end by speech frame stealing. More particularly, the data of a speech frame contained in certain determined TDMA frames (or radio frames) is replaced with a cryptographic synchronization information cue. The latter allows the receiver terminal to generate the cryptographic sequence suitable for the decryption of the speech data transmitted in the TDMA frames which follow immediately. There is therefore a determined and fixed time relation between the transmission of the synchronization information cues and that of the encrypted data to which they pertain. The cryptographic synchronization information cue is said to be transmitted in-band with reference to the fact that it occupies useful resources of the communication. Reference may for example be made to American patent No. 2002/0066013 for an example of this technique applied to the TETRA system.

In this application, the known technique nevertheless has numerous drawbacks.

Firstly, the initial synchronization must be of good quality so as to avoid the situation whereby radioelectric transmission errors would deprive numerous terminals receiving in group communications, of the possibility of receiving and of decrypting speech correctly. This is why the cryptographic synchronization information cue is repeated in general 4 times in the course of the first second of the communication, i.e. in the course of the first 34 frames, thereby giving rise to a frame stealing rate of the order of 11%, severely degrading the quality of the speech.

Subsequently, the choice of the periodicity of the repetition of the cryptographic synchronization information cue leads to a compromise between the quality of the speech which requires a low periodicity of frame stealing, on the one hand, and the minimization of the delay upon late entries which on the contrary requires a high periodicity, on the other hand. This compromise is in general unsatisfactory.

Finally, in systems offering end-to-end encryption services, the cryptographic synchronization must be the subject of particular care when a mobile terminal receiving performs a change of cell in the course of a communication (or "handover"). Specifically, the different propagation times for the speech packets in the network subsystem generally lead to a loss of synchronization upon a change of cell. This loss of synchronization is temporary in the case where the synchronization information cues are repeated periodically by being transported by speech frame stealing, as in the TETRA system. However, the transmission of these synchronization information cues takes place with a much lower periodicity than the duration of a correctly designed change of cell. This results in a non-negligible delay in the re-establishing of the communication in the target cell, which leads to strong degradation of the quality of service. The only solution for alleviating this drawback would be to increase the periodicity of repetition of the cryptographic synchronization information cue. Nevertheless, since this information cue is transported by speech frame stealing, the quality of the speech would be strongly degraded.

Therefore, it is desirable to define a cryptographic synchronization mechanism in a TDMA system possessing an associated signaling channel, which eliminates the aforesaid drawbacks of the prior art.

It is also desirable to propose a mechanism for maintaining cryptographic synchronization upon a change of cell in the course of a communication by a mobile terminal receiving.

SUMMARY OF THE INVENTION

A first aspect of the invention thus proposes a method for transmitting encrypted data between a sender mobile terminal and at least one receiver mobile terminal of a digital radiocommunication system, through a radio transmission channel having a frame structure such that a TDMA frame comprises time slots of a first type forming a traffic channel for the transmission of traffic information and at least one time slot of a second type forming an associated signaling channel for the transmission of signaling information. The method comprises the following steps:

a sequence of encrypted data packets is transmitted in the traffic channel on the basis of a determined time slot of the first type, whereas an associated cryptographic synchronization information cue is transmitted in the associated signaling channel inside a determined time slot of the second type, and a cryptographic synchronization delay information cue relating to the time gap between said determined time slot of the second type and said determined time slot of the first type, is also transmitted in the associated signaling channel.

Thus, the cryptographic synchronization information cue is transmitted in the associated signaling channel when resources are available therein for this purpose, thus avoiding the drawbacks of the speech frame stealing of the technique known in the prior art.

A second aspect of the invention relates to a method for decrypting a sequence of encrypted data packets transmitted between a sender mobile terminal and at least one receiver mobile terminal of a digital radiocommunication system, through a radio transmission channel having a frame structure such that a TDMA frame comprises time slots of a first type forming a traffic channel for the transmission of traffic information and at least one time slot of a second type forming an associated signaling channel for the transmission of signaling information. The method comprises the steps of:

receiving said sequence of encrypted data packets on the basis of a determined time slot of the first type;

optionally, receiving an associated cryptographic synchronization information cue in the associated signaling channel, inside a determined time slot of the second type, and, in this case, also receiving, in the associated signaling channel, a cryptographic synchronization delay information cue relating to the time gap between said determined time slot of the second type and said determined time slot of the first type;

generating a value of an initialization vector having served to generate a cryptographic sequence used for the encryption of said sequence of encrypted data packets;

generating the same cryptographic sequence, on the basis of the initialization vector value generated in the step of generating a value of an initialization vector;

shifting the cryptographic sequence generated in the step of generating the same cryptographic sequence as a function of said cryptographic synchronization delay information cue; and decrypting said sequence of encrypted data packets on the basis of said shifted cryptographic sequence.

A third aspect of the invention relates to a device for transmitting encrypted data between a sender mobile terminal and at least one receiver mobile terminal of a digital radiocommunication system, through a radio transmission channel having a frame structure such that a TDMA frame comprises time slots of a first type forming a traffic channel for the transmission of traffic information and at least one time slot of a second type forming an associated signaling channel for the transmission of signaling information, comprising:

means for transmitting a sequence of encrypted data packets in the traffic channel on the basis of a determined time slot of the first type, and for transmitting a cryptographic synchronization information cue in the associated signaling channel inside a determined time slot of the second type, and means for also transmitting in the associated signaling channel, a cryptographic synchronization delay information cue relating to the time gap between said determined time slot of the second type and said determined time slot of the first type.

A fourth aspect of the invention relates to a device for decrypting a sequence of encrypted data packets transmitted between a sender mobile terminal and at least one receiver mobile terminal of a digital radiocommunication system, through a radio transmission channel having a frame structure such that a TDMA frame comprises time slots of a first type forming a traffic channel for the transmission of traffic information and at least one time slot of a second type forming an associated signaling channel for the transmission of signaling information, comprising:

first means of reception for receiving said sequence of encrypted data packets on the basis of a determined time slot of the first type;

second means of reception for, optionally, receiving an associated cryptographic synchronization information cue in the associated signaling channel, inside a determined time slot of the second type, and, in this case, means of reception for also receiving, in the associated signaling channel, a cryptographic synchronization delay information cue relating to the time gap between said determined time slot of the second type and said determined time slot of the first type;

first means of generation for generating a value of an initialization vector having served to generate a cryptographic sequence used for the encryption of said sequence of encrypted data packets;

second means of generation, for generating the same cryptographic sequence, on the basis of the initialization vector value generated by said first means of generation;

means of shifting for shifting the cryptographic sequence generated by said second means of generation as a function of said cryptographic synchronization delay information cue; and means for decrypting said sequence of encrypted data packets on the basis of said shifted cryptographic sequence.

Finally, a fifth and last aspect of the invention relates to a mobile terminal of a digital radiocommunication system, comprising a transmission device and/or a decryption device as defined hereinabove.

BRIEF DESCRIPTION OF THE DRAWINGS

FIG. 3a and FIG. 3b are, respectively, a chart and an array illustrating an example of encapsulation of speech frames (or speech packets) in the frame structure of FIG. 2;

FIG. 11 is a conversion table giving a value of time gap expressed as a number of speech frames as a function of the value of said time gap expressed as a number of time slots, in the exemplary encapsulation of FIGS. 3a and 3b;

DESCRIPTION OF PREFERRED EMBODIMENTS

The base station of a cell can set up logical channels for traffic with one or more mobile terminals situated in its zone of radio coverage, after a call setup procedure performed by means of a dedicated logical control channel. The traffic channel set up with a mobile terminal is a downlink and/or an uplink. One or more logical traffic channels are multiplexed, on a determined frequency, with an associated signaling logical channel serving to exchange signaling during communication.

The invention is described hereinbelow in its application to an exemplary radiocommunications system which is a TDMA-2 system, that is to say a system of TDMA type of order 2.

Figure 2:
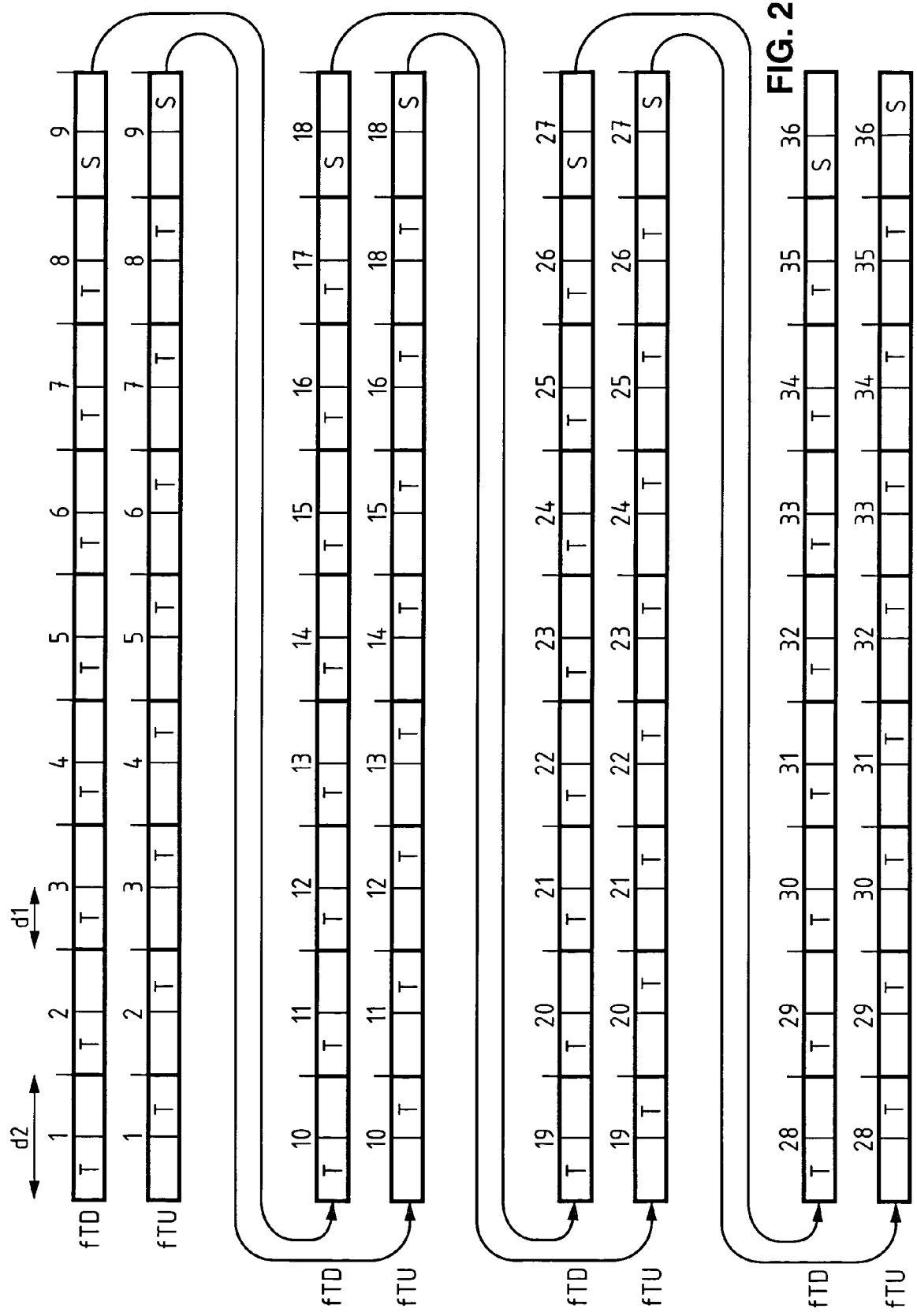
FIG. 2 is a chart showing an exemplary frame structure in a TDMA radiocommunication system.

FIG. 2 is a chart which illustrates an exemplary structure of a radio superframe on physical traffic channels in such an example. Represented vertically juxtaposed in this figure are, on the one hand, the structure of a radio superframe on an uplink physical traffic channel set up on a determined frequency $f_{TU}$, and, on the other hand, the structure of a radio superframe on a downlink physical traffic channel set up on a determined frequency $f_{TD}$, different from the frequency $f_{TU}$.

A superframe of the physical traffic channel is subdivided into four frames (also called radio frames, TDMA frames or segments, in the jargon of the person skilled in the art), which are represented one above the other in the figure. Stated otherwise, a TDMA frame corresponds to a quarter of a superframe. Each TDMA frame is composed of nine composite time slots each having a duration d2 equal to 40 ms, and each comprising two consecutive elementary time slots, each of duration d1 equal to 20 ms.

Each of the first eight composite time slots of each frame comprises an odd elementary time slot for the downlink direction and an even elementary time slot for the uplink direction, which are labeled by the letter T. The recurrent series of these time slots T forms a logical traffic channel or TCH channel (standing for Traffic CHannel"), respectively down and up. Consequently, on the same downlink physical traffic channel set up on the determined frequency $f_{TD}$, the base station can multiplex, in the even elementary time slots, another logical traffic channel set up with another mobile station.

The ninth composite time slot of each segment is reserved for the transmission of signaling information. The recurrent series of these time slots, which are labeled by the letter S, forms an associated signaling logical channel, respectively down and up. In practice, several logical channels may be multiplexed in the time slots S of the superframe. However, for the sake of convenience, reference will be made in what follows to a single signaling channel. The channel in question is one of SACCH type (standing for "Slow Associated Control CHannel") that is to say a slow control channel making it possible to perform the supervision of the logical traffic channel with which it is associated.

In FIG. 2, the index numbers indicated above the frames correspond to the index numbers of composite time slots in the superframe, that is to say also to the index numbers of elementary time slots in each of the uplink and downlink channels.

According to the invention, this associated signaling channel is used for the transmission of the periodic cryptographic synchronization information cues. The latter are therefore transmitted "out-of-band". This technique makes it possible to avoid frame stealing throughout the duration of the PTT in progress. Frame stealing occurs only for the transmission of the initial cryptographic synchronization.

For example, the cryptographic synchronization information cue which is transmitted at a determined instant is the current value of the initialization vector, that is to say the value having served for the generation of the current cryptographic sequence, that is to say also for the generation of the current sequence of encrypted data.

Now, an encrypted data sequence is sent in the TCH channel as soon as this sequence is available. In particular, the PTT in progress can commence on any time slot T whatsoever between two consecutive time slots S. By choosing a cryptographic sequence whose length in number of bits corresponds advantageously to the number of useful bits transmitted between two consecutive time slots S, it is certain that, for a determined PTT, each sequence of encrypted data will be transmitted on the basis of the same time slot in each TDMA frame.

It is nevertheless necessary to alleviate the absence of any fixed time relation (from one PTT to another) between the cryptographic sequences such as they are generated in the sender terminal for encryption, on the hand, and the time slots S that can be used for the transmission of the corresponding periodic cryptographic synchronization information cues, on the other hand. Moreover, it is also necessary to alleviate the absence of any fixed time relation between the synchronization sequences that must be generated by the receiver terminal for decryption, on the one hand, and the time slots used for the transmission of the cryptographic synchronization information cues, in a cell which may be different from that in which the sender terminal is located and not be synchronized (from a temporal point of view) with respect to the latter cell, on the other hand.

The data unit output by a speech coder of the sender terminal is a speech frame, and corresponds to a data packet of determined size. Let M denote the size (in number of bits) of a speech packet or frame, that is to say the number of bits of a speech packet. In the example considered in what follows, M=88. When the bit rate at the output of the speech coder is equal to 4.4 Kbits/s (kilo bits per second), the duration of a speech packet or frame is thus equal to 20 ms.

Let N denote the length (in number of bits) of the cryptographic sequence $SC_i$. Preferably, N is an integer multiple of M. Stated otherwise, there exists an integer number P such that:

$$N = P \times M \qquad (4)$$

It follows that, for encryption, each cryptographic sequence $SC_i$ is combined bitwise in the Exclusive-OR operator (one sometimes says "XORed") with P speech frames delivered in succession by the speech coder. A new cryptographic sequence $SC_i$ is therefore generated once every P speech frames.

In the example considered in what follows, N=1584 and P=18.

When N corresponds to the number of useful bits transmitted between two time slots S, the P×M bits of P consecutive speech frames may be encapsulated in exactly eight radio time slots. In the example considered, the bit rate on the radio channel is equal to 16 Kbits/s, this providing ample allowance for the transmission in each time slot T (whose duration d1, it will be recalled, is equal to 20 ms) of a number of useful bits equal to N/8. These 198 useful bits may be split up in four different ways.

According to a first way, a time slot comprises, in this order:
 88 bits of a first speech packet transmitted in full;
 88 bits of a second speech packet transmitted in full; and
 22 bits of a third speech packet only a quarter of which is transmitted in this time slot.

According to a second way, a time slot comprises in succession:
 66 bits of a first speech packet transmitted, only three quarters of whose bits are transmitted in this time slot;
 88 bits of a second speech packet transmitted in full; and
 44 bits of a third speech packet, only half of whose bits are transmitted in this time slot.

According to a third way, a time slot comprises, in this order:
 44 bits of a first speech packet, only half of whose bits are transmitted in this time slot;
 88 bits of a second speech transmitted in full; and
 66 bits of a third packet transmitted, only three quarters of whose bits are transmitted in this time slot.

According to a fourth and last way, the following are placed in a time slot, in this order:
 22 bits of a first speech packet, only a quarter of which is transmitted in this time slot;
 88 bits of a second speech packet (data contained in a speech frame) transmitted in full; and
 88 bits of a third speech packet transmitted in full.

By combining these four ways of distributing a group of 196 bits within a radio time slot, one after the other, and by repeating this combination a second time, it is possible to transmit 18 speech packets, respectively denoted P1 to P18 in 8 time slots i.e. a TDMA frame, as is presented in the timing chart of FIG. 3a and in the array of FIG. 3b. For the sake of clarity, the timing chart of FIG. 3a shows only the time slots, denoted T1 to T9, of one of the links, up or down, of the traffic channel.

Figure 4:
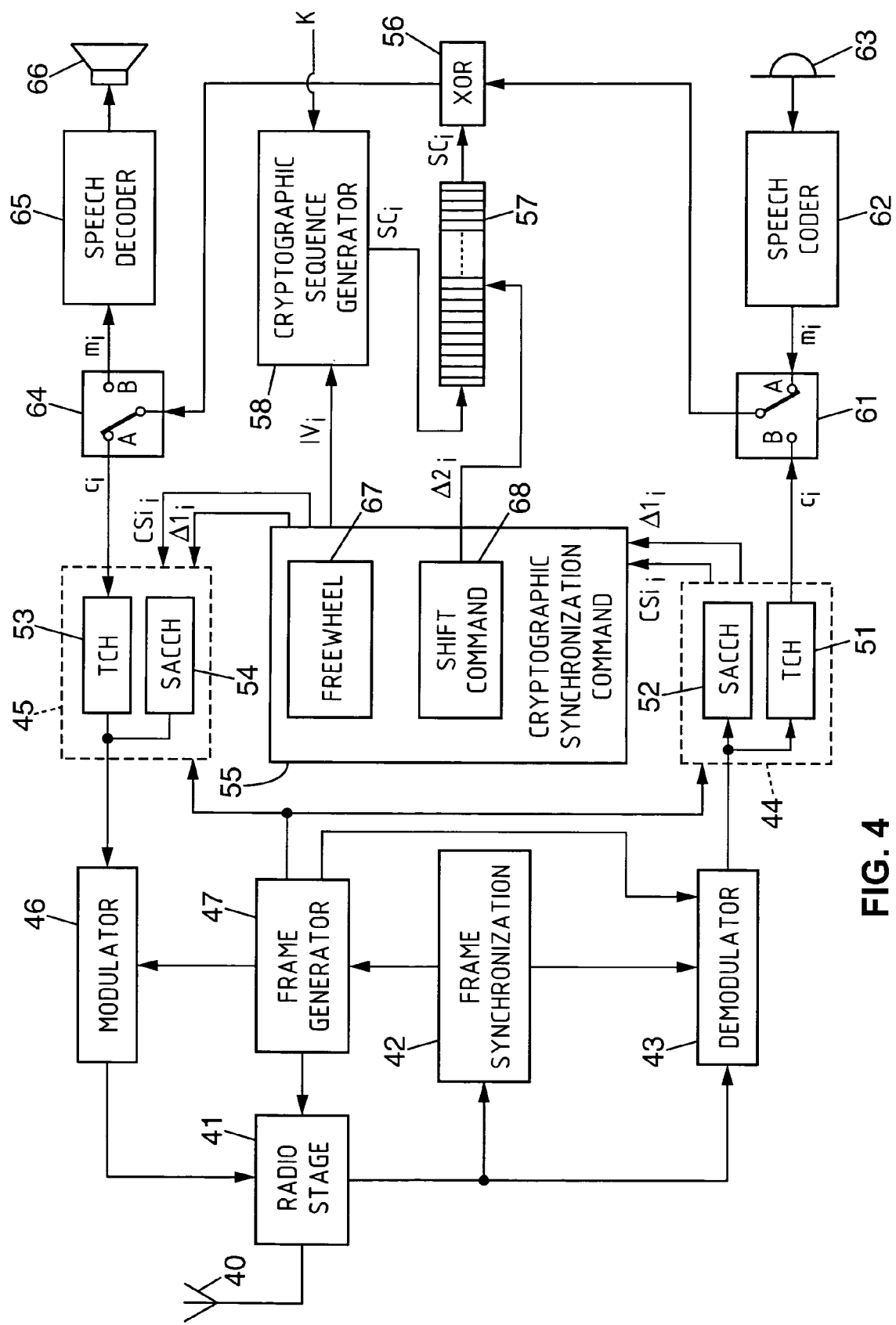
FIG. 4 is a schematic diagram of a mobile terminal according to the invention.

A schematic diagram of a mobile terminal according to the invention is represented in FIG. 4. The antenna 40 of the terminal is linked to its radio stage 41 corresponding to the analog part of the terminal.

For the receive part, the baseband signal delivered by the radio stage 41 is provided to a synchronization unit 42 and to a demodulator 43. The unit 42 searches for the synchronization patterns in the signal received. It carries out the terminal's temporal synchronization function. The demodulator 43, which is synchronized by the unit 42, estimates the symbols transmitted on the basis of the baseband signal, and provides these estimated symbols to a circuit 44 for processing the signal received.

For the send part, a circuit 45 for processing the signal to be sent delivers symbols to be sent which are modulated by a modulator 46. The latter delivers the modulated symbols to the radio stage 41.

A frame generator 47, which is synchronized by the unit 42, controls the radio stage 41, the demodulator 43 and the modulator 46 so as to place the terminal in receive mode or in send mode in the appropriate time slots according to the frame structure of the radiocommunications system. In the case of the exemplary frame structure described in FIG. 2, the terminal is alternately in send mode and in receive mode, changing every 20 ms. The frame generator 47 also carries out the sequencing of the circuit 44 for processing the signal received, and that of the circuit 45 for processing the signal to be sent.

FIG. 4 illustrates in each of the blocks 44 and 45, circuits 51 and 52, and 53 and 54 respectively for processing the logical channels, respectively traffic and signaling channels, which were alluded to earlier with reference to FIG. 2.

When the terminal is a sender in a communication in progress, a first pathway A of a two-pathway switch 61 receives successive plaintext data sequences $m_i$, which are delivered by a speech coder 62 on the basis of the analog signal produced by a mike 63 when a PTT button ("Push-To-Talk") of the terminal is activated by the user.

The output of the switch 61 is linked to a first input of an Exclusive-Or operator 56 for the encryption of the sequence $m_i$. A second input of the operator 56 receives a cryptographic sequence $SC_i$ generated by a cryptographic sequence generator 58, through a shift register 57. The sequence $SC_i$ is generated by the generator 58 on the basis of a determined secret cipher key K, on the one hand, and of the current value $IV_i$ of an initialization vector, on the other hand. A cryptographic synchronization control unit 55 delivers the current value $IV_i$ of the initialization vector to the generator 58.

The initialization vector $IV_i$ varies over time and changes value (in parallel on the sender side and receiver side) with each repetition of the sequence $SC_i$, that is to say every P speech packets. In a simple example, the value of the vector $IV_i$ depends on the value of the counter of time slots in the cell of the sender terminal. Of course, any other law of evolution of the value of the vector $IV_i$ is possible, provided that this law is deterministic so that it can be followed in parallel by the sender terminal and the receiver terminal or terminals.

The cipher key K, for its part, is constant for a determined communication. It is generated during setup of the communication by an appropriate algorithm for choosing a cipher key. If necessary, an index defining this key can be transmitted in the call setup signaling or be transmitted in the initial signaling sequence of the PTT, and then subsequently in the associated signaling channel for the late entry function.

The output of the operator 56 delivers a sequence of encrypted data $c_i$ which is delivered to the circuit 53 of the processing circuit 45 through a first pathway A of a second two-pathway switch 64.

A cryptographic synchronization information cue $CSI_i$ is delivered by the unit 55 to the circuit 45 for processing the data to be sent. This cryptographic synchronization information cue is derived from the initialization vector value $IV_i$ used for the generation of the sequence $SC_i$ having served for the encryption of the sequence $c_i$. It is sent, under the control of the frame generator 47, in at least one traffic time slot T at the start of the PTT, coming in the frame structure immediately before the time slot in which the first sequence of encrypted data $c_i$ with i=0 is transmitted (initial synchronization). For this "in-band" send, it is the circuit 53 which is active. The information cue $CSI_i$ is also repeated, with a determined periodicity (which may be variable over the duration of the communication), in determined time slots S of the associated signaling channel, for the following encrypted data sequences, that is to say the sequences $c_i$ with i different from 0 (periodic synchronization). For these "out-of-band" sends, it is the circuit 54 which is active.

Moreover, a cryptographic synchronization delay information cue $\Delta 1_i$ is also delivered by the unit 55 to the processing circuit 45. It relates to the time gap between the start of transmission of the encrypted data packets of the sequence $c_i$ other than the first, on the one hand, and the transmission of the periodic cryptographic synchronization information cue $CSI_i$ (for i different from 0), on the other hand. The information cue $\Delta 1_i$ is preferably expressed as a number of time slots, since it is then coded by only three bits (by taking values from 0 to 7). Nevertheless, this is not compulsory. It may also be expressed as a number of speech packets. It is sent in a time slot S of the associated signaling channel (preferably the same as that in which the periodic synchronization information cue $CSI_i$ is transmitted, since this is simpler, but it may also be a different time slot S).

When the terminal is a receiver in a communication in progress, the circuit 51 of the circuit for processing the signal received 44 delivers sequences of encrypted data $c_i$ which are transmitted on a second pathway B of the switch 61. Moreover, at the start of the PTT, the circuit 51 delivers the cryptographic synchronization information cue $CSI_i$ received in the traffic channel TCH to the unit 55. After the start of the PTT, it is the circuit 52 of the circuit 44 which, for at least certain sequences $c_i$, delivers the information cue $CSI_i$ and also the information cue $\Delta 1_i$ to the unit 55, these information cues being received in the associated signaling channel SACCH.

The Exclusive-Or operator 56 receives the sequence $c_i$ through said pathway B of the switch 61 and carries out the decryption thereof in a manner dual to that with which it carries out the encryption when the terminal is a sender. The output of the operator 56 then delivers a plaintext data sequence $m_i$ which is delivered to a channel decoder 65 through a second pathway B of the switch 64. The decoder 65 delivers, on the basis of the sequence $m_i$, an analog signal which is restored in a form audible to the user via a loudspeaker 66.

A value $IV_i$ of the initialization vector is delivered by the unit 55 to the generator 58 for each sequence $c_i$ to be decrypted. It will be noted that, on the receiver terminal side, the value of the initialization vector $IV_i$ can be derived from the value of the cryptographic synchronization information cue $CSI_i$ received. Nevertheless, the appropriate value $CSI_i$ is received only in certain at least of the time slots S of the SACCH channel, that is to say for only certain of the encrypted data sequences to be decrypted. Other encrypted data sequences $c_i$ are received, for which the corresponding cryptographic synchronization information cue $CSI_i$ is not received.

When the cryptographic synchronization information cue $CSI_i$ (for i different from 0) is received in a time slot S of the SACCH channel, it is delivered to the unit 55 by the circuit 52. The information cue $IV_i$ is derived therefrom by the unit 55 and it is then delivered by the unit 55 to the generator 58. Moreover, the circuit 52 then delivers the aforesaid information cue $\Delta 1_i$ also to the unit 55. A module 68 for control of shift of the unit 55, then generates an information cue $\Delta 2_i$ on the basis of the information cue $\Delta 1_i$. This information cue serves to shift the cryptographic sequence $SC_i$ so as to take account of the time gap between the start of transmission of the encrypted data packets of the sequence $c_i$ other than the first, on the one hand, and the transmission of the periodic cryptographic synchronization information cue $CSI_i$ pertaining to the sequence $c_i$, on the other hand. The information cue $\Delta 2_i$ is expressed as a number of bits to be shifted. The shift is performed by controlling the shift register 57 appropriately, in a manner which is within the scope of the person skilled in the art.

When, conversely, a sequence of encrypted data $c_i$ is received but not the cryptographic synchronization information cue $CSI_i$ (still for i different from 0), which was used for the encryption of the sequence $c_i$, the information cue $IV_i$ is generated by a module 67 of the unit 55, referred to as the "freewheel" module, on the basis of the knowledge of the last value $IV_i$ derived from a value $SCI_i$ received, on the one hand, and the law of evolution of the value $IV_i$, on the other hand. Such a module implements a reversible algorithm, the so-called "freewheel" algorithm, which is known per se. "Reversible" is understood to mean the fact that it can run in either direction, each time giving an output value obtained in a deterministic manner on the basis of the input value. Consequently, if it is applied a first time in a determined direction to a determined input value, then a second time in the reverse direction to the output value obtained previously, then said determined input value ought to be retrieved. Reference may for example be made to that adopted in the standard of the PMR system called Project 25-Phase 1 of the APCO (standing for "Association of Public-Safety Communications Officials-International, Inc.") which is incorporated here by reference. Such an algorithm utilizes the deterministic nature of the law of evolution of the value of the initialization vector.

To summarize, the switches 61 and 64 are operated in such a way that their respective pathway A is activated when the terminal is a sender (case represented in the figure), and that their respective pathway B is activated when the terminal is a receiver.

Figure 5:
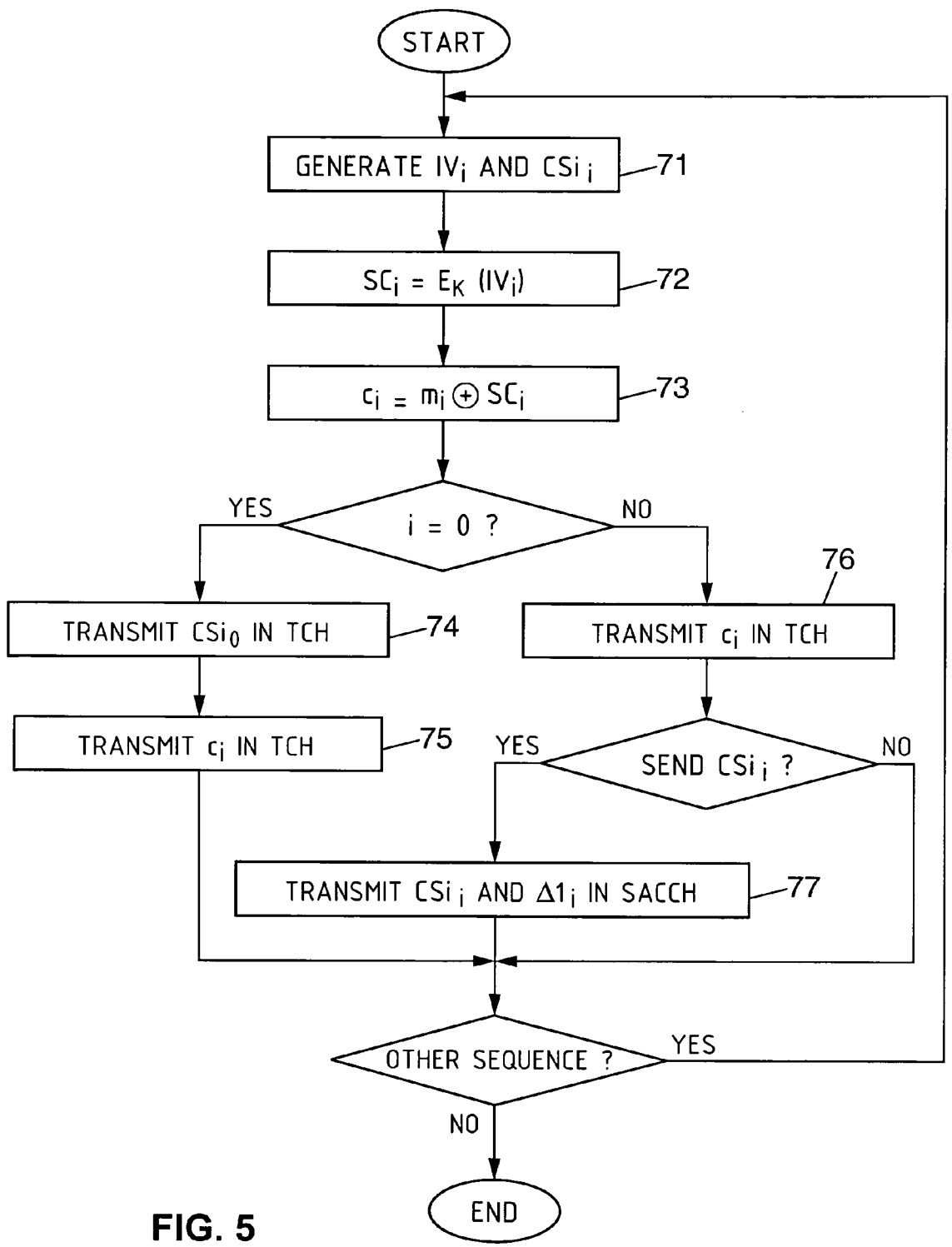
FIG. 5 is a chart illustrating an example of sequences of steps of a process for transmitting encrypted data according to the invention.

Represented in FIG. 5 is an exemplary sequence of steps for the transmission of an encrypted data sequence determined in accordance with the transmission process of the invention. This process is implemented in a mobile terminal when it is a sender in a communication (that is to say the terminal having the PTT in progress).

In a step 71, the unit 55 generates the current value of the initialization vector $IV_i$, according to a deterministic evolution law. In an advantageous embodiment, the current value $IV_i$ is dependent on the value of the counter of time slots in the cell where the sender terminal is located. The value of the time slot counter is kept up-to-date by the network infrastructure for each cell. It is known to each mobile terminal which is communicated in this cell. This counter's function is to allow the radio synchronization of the terminals with the base station of the cell.

It is assumed in this exemplary embodiment that the various cells are mutually synchronized, from a radio point of view, rather inaccurately, for example with the accuracy provided by NTP (standing for "Network Time Protocol"). The values of the counters of time slots in the various cells may therefore be different, but the difference between these values is small and can be bounded a priori.

At the start of a PTT, the unit 55 of the sender terminal generates a random value coded on Q1 bits, where Q1 is a determined integer number. This value is held in memory throughout the duration of the PTT.

Figure 1:
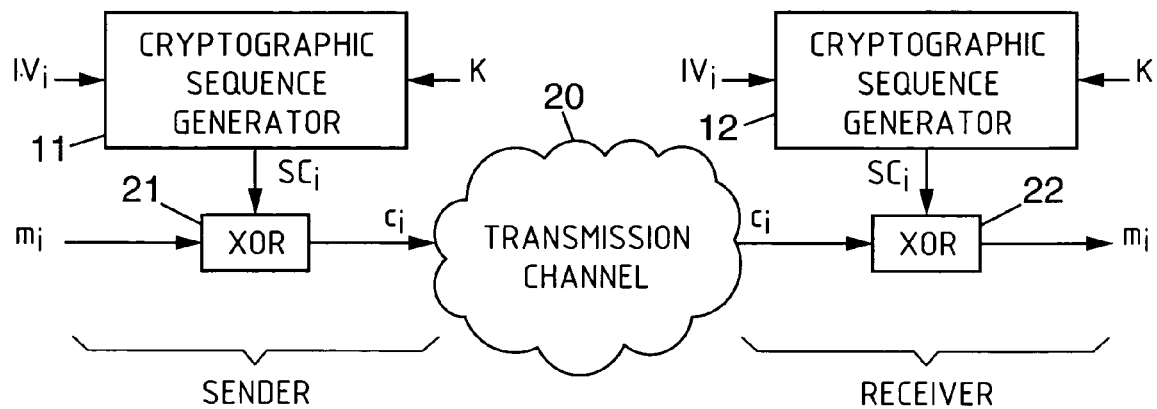
FIG. 1, already analyzed, is a schematic diagram illustrating the encryption and the decryption of data transmitted between a sender and a receiver.
Figure 6:
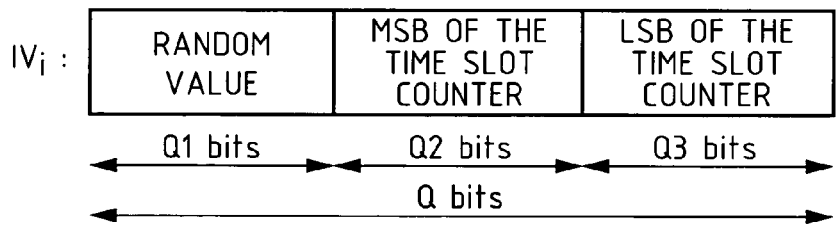
FIG. 6 is a chart illustrating an example of an initialization vector according to the invention.

As is illustrated by the chart of FIG. 6, each value of the initialization vector $IV_i$ results from the binary concatenation of the Q1 bits of this random value and of a determined number Q2+Q3 of bits of the current value of the time slot counter, where Q2 and Q3 are determined integer numbers. In the example represented, the Q1 bits of the random value form the Q1 most significant bits or MSB of $IV_i$, the Q3 least significant bits or LSB of the value of the time slot counter form the Q3 LSB of $IV_i$, and the Q2 MSB of the value of the time slot counter form Q2 intermediate bits of $IV_i$. The initialization vector $IV_i$ therefore comprises a determined number Q of bits, such that Q=Q1+Q2+Q3.

Figure 7:
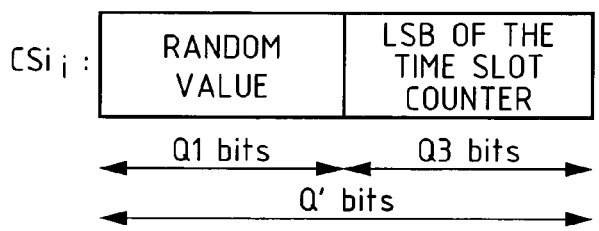
FIG. 7 is a chart illustrating an example of a synchronization information cue according to the invention, corresponding to the example of the initialization vector according to FIG. 6.

The unit 55 also generates the cryptographic synchronization information cue $CSI_i$, at least when this information cue can or must be transmitted. It is recalled that the value $CSI_i$ is derived from the value $IV_i$. In the example represented in FIG. 7, the Q1 bits of the random value form the Q1 MSB of $CSI_i$, and the Q3 LSB of the value of the time slot counter form the Q3 LSB of $CSI_i$, so that $CSI_i$ is coded on a determined number Q' of bits such that Q'=Q1+Q3.

The at least approximate synchronization of the time slot counters of each of the cells of the sender terminal and of the receiver terminal, in fact makes it possible to transmit only the Q3 LSB of the value of the counter of the cell of the sender terminal (in addition to the random value coded on Q1 bits, of course) to the receiver terminal. Specifically, the receiver terminal which is located in any cell whatsoever of the system can then reconstitute the entire value of the time slot counter of the cell of the sender terminal on the basis of the value of the time slot counter in its own cell (of which it will take the Q2 MSB, to within a unit as the case may be), on the one hand, and Q3 LSB received on the other hand.

The advantage presented by this method is that the variability introduced by the time slot counter is added to the variability of the random value generated by the sender terminal. This in fact increases the degree of security without increasing the size of the random value to be generated. Moreover, this method guarantees total protection against playback.

As a variant, the difference between the values of the time slot counters in the respective cells of the sender terminal and of the receiver terminal can be transmitted in the information cue $SCI_i$, instead of transmitting the LSB of the value of the time slot counter in the cell of the sender terminal.

It will be noted that the law of evolution of the initialization vector $IV_i$ is deterministic in the sense that, knowing a value of the vector at a given instant, it is possible to deduce its value $IV_j$ at a later instant (with j>i), as a function of the evolution of the value of the time slot counter in the cell of the sender terminal. It will also be noted that the initial random value must be transmitted each time in the value $CSI_i$ so as to allow the late entry of other terminals.

Returning to FIG. 5, the generator 58 produces the current cryptographic sequence $SC_i$ in a step 72, according to the relation already given above:

$$SC_i = E_K(IV_i) \qquad (1)$$

where $E_K$ designates the encryption of the information cue $IV_i$ with the key K, according to a determined encryption algorithm which is the same for all the mobile terminals of the system, and which, of course, is the same whether the terminal be a sender or a receiver. The sequence $SC_i$ is stored in the register 57 as and when it is generated.

When the sequence $SC_i$ is fully available, then, in a step 73, the operator 56 performs a bitwise Exclusive-OR operation between the N bits of the sequence $SC_i$ and an identical number P×M of bits originating from P consecutive speech packets forming a plaintext data sequence $m_i$ of P×M bits (these P×M bits being stored in an appropriate shift register, not represented).

A distinction is then made between the case of the first encrypted data sequence, that is to say when i is equal to 0, which corresponds to the initial cryptographic synchronization (at the start of the PTT), and the case of subsequent encrypted data sequences, that is to say when i is different from 0, which corresponds to the periodic cryptographic synchronization.

Let us firstly consider the case where i is equal to 0 (i=0). In an example, time slot 2 (see FIG. 2) of a given TDMA frame carries the PTT request (start of transmission by the sender terminal). The initial cryptographic synchronization information cue $CSI_0$ is then transmitted, in a step 74, in one or more of the subsequent time slots T, for example the two time slots 3 and 4, while being repeated several times (for example as many times as its length so permits, having regard to the signaling bits to be transmitted in addition to the useful bits, knowing that a 20 ms time slot can contain at most 320 bits with a bit rate of 16 Kbits/s).

The encrypted data sequence $c_0$ is then transmitted, in a step 75, on the basis of the subsequent time slot T, here time slot 5. This time slot contains the first two speech frames, as well as a quarter of the next speech frame (see array of FIG. 3b). It will be noted that in the case where the first speech information cue transmitted in a determined time slot corresponds to an incomplete speech frame (for example time slots 2, 3, 4, 6, 7, 8, 11, 12, etc), the first speech frame is preferentially inserted into this determined time slot on the basis of the first temporal position such that the first speech frame will be transmitted completely in this time slot (reference is made to the chart and to the array of FIGS. 3a and 3b, respectively). In this way, it is certain that the speech information cues transmitted up to the next signaling time slot S always correspond to an integer number of speech frames. This simplifies the determination of the information cue $\Delta 2_i$ for the periodic synchronization (see further on).

Stated otherwise, the transmission of speech is therefore preceded by an in-band transmission of the initial cryptographic synchronization information cue. This transmission generally gives rise to no degradation of quality of the speech, since it occurs during a time period serving for the calculation by the speech coder of the first speech frames to be transmitted.

Let us now consider the case where i is different from zero. We note firstly that the cryptographic sequences $SC_i$ and therefore the encrypted data sequences $c_i$ preferably have a length in bits equal to the duration separating two time slots S devoted to signaling (having regard to the useful bit rate on the channel). Thus, the position of the sequences $c_i$ is fixed with respect to the time slots S in the course of a determined PTT. However, this position varies from one PTT to another. In the example envisaged above, the sequences $c_i$ go from time slot 5 to time slot 13, from time slot 14 to time slot 22, etc.

In a step 76, the current sequence of encrypted data $c_i$ is transmitted on the basis of a time slot of the TCH traffic channel, here the slot 14 for the second sequence $c_1$ (i=1), slot 23 for the third sequence $c_2$ (i=2), etc, having regard to the assumption made above.

When the conditions exist such that the cryptographic synchronization information cue is transmitted, the value $CSI_i$ is also transmitted, in a step 77, inside a determined time slot S of the associated signaling channel SACCH. In an example, said determined time slot S is the time slot S coming in the frame structure immediately before, or the first time slot of the second type coming in the frame structure after the time slot T on the basis of which the sequence $c_i$ is transmitted. It is thus slot 9 (for i=1), slot 18 (for i=2), etc. By virtue of this characteristic, the information cue $CSI_i$ and the sequence $c_i$ are transmitted in time slots that are as close together as possible, this simplifying their processing by the receiver terminal.

In step 77, the information cue $\Delta 1_i$ is also transmitted in a time slot S of the SACCH channel, preferably the same as that in which the information cue $CSI_i$ is transmitted. In this way, the information cue $\Delta 1_i$ is received by the receiver substantially at the same time as the information cue $CSI_i$. This simplifies the processing by the receiver terminal, and guarantees a minimum delay upon the late entry of a new receiver terminal into the communication, since all the information cues that it needs to decrypt the sequence $c_i$ reach it in the shortest possible period of time.

In an advantageous example, the information cue $\Delta 1_i$ is the number of time slots T of the TCH traffic channel separating the time slot T on the basis of which the sequence $c_i$ is transmitted in a determined frame, and the time slot S of the SACCH channel in which the information cue $CSI_i$ and also the information cue $\Delta 1_i$ are transmitted. In the example considered above, this number is equal to four (9−5=4; 18−14=4; etc). This is advantageous since the value of $\Delta 1_i$ thus lies between 0 (when the information cue $CSI_i$ and the information cue $\Delta 1_i$ are transmitted in the time slot S coming in the frame structure immediately before the time slot T on the basis of which the sequence $c_i$ is transmitted) and 7. The value $\Delta 1_i$ may therefore be coded on just 3 bits. It will be noted that if the value $\Delta 1_i$ was counted as a number of speech packets (thereby constituting a possible variant), it could take a value between 0 and 16, and ought therefore to be coded on 4 bits.

The above steps are repeated for each plaintexttext data sequence $m_i$ during the PTT in progress.

Figure 8:
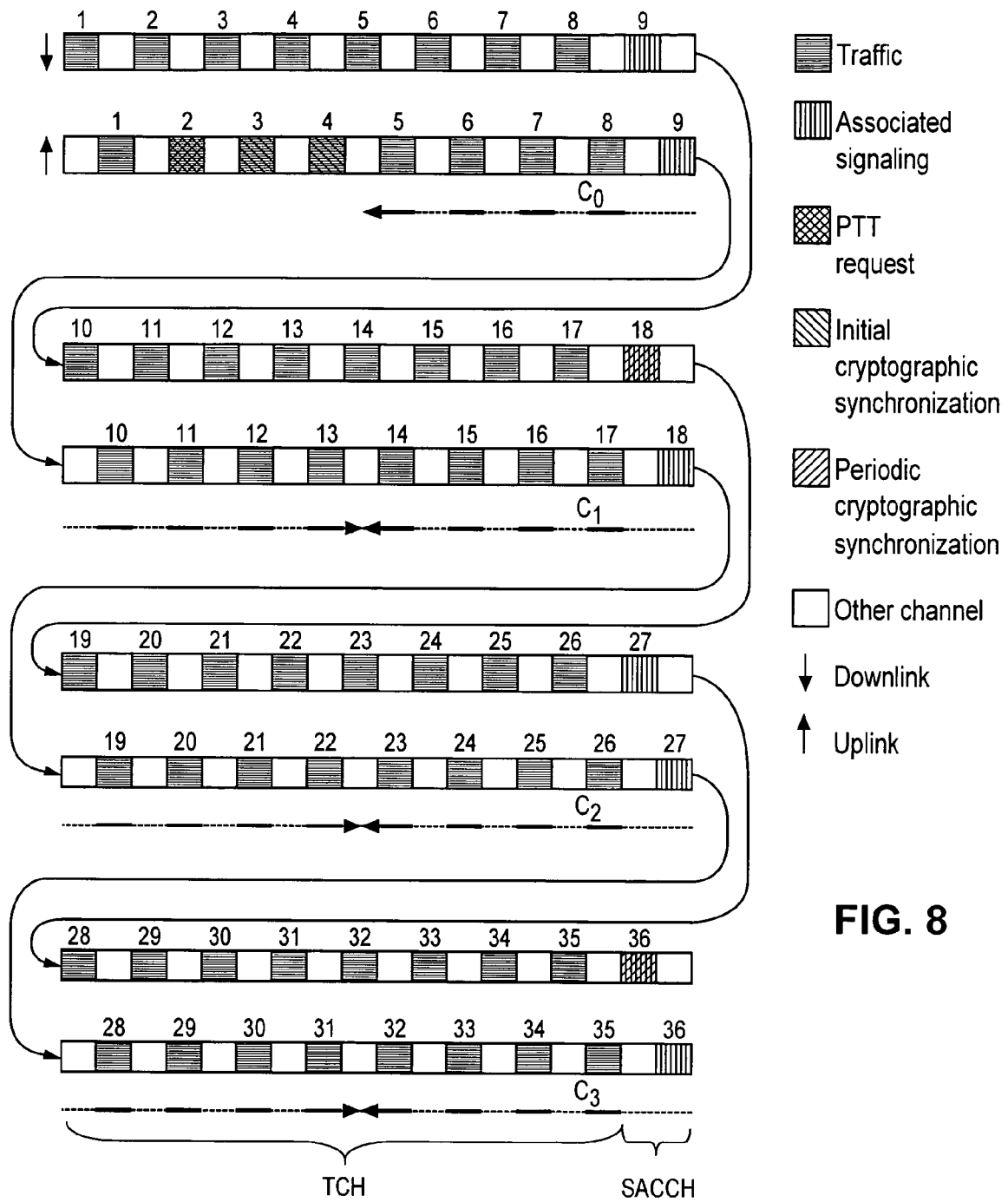
FIG. 8 is a chart illustrating an example of transmitting four first sequences of encrypted data in a superframe of the radio channel for a determined PTT.

FIG. 8 is a chart which illustrates the transmission, in a determined superframe, of the first four encrypted data sequences $c_0$ to $c_3$, of a determined PTT, by a determined sender terminal, in accordance with the example envisaged in the foregoing. The spreading of the encrypted data of each sequence in the superframe is symbolized by respective horizontal arrows, which are solid in respect of the traffic channel time slots in which data are sent, and dashed otherwise.

In accordance with this example, the following are transmitted on the uplink: the PTT request in time slot 2; the initial synchronization information cue $CSI_0$ in time slots 3 and 4; the sequences $c_0$, $c_1$, $c_2$ and $c_3$ on the basis, respectively, of time slots 5, 14, 23 and 32; the periodic synchronization information cue $CSI_1$ and the information cue relating to the corresponding time shift $\Delta 1_1$ in the signaling time slot 18; as well as the periodic synchronization information cue $CSI_3$ and the information cue relating to the corresponding time shift $\Delta 1_3$ in the signaling time slot 36. It is recalled that in this example the information cues $\Delta 1_1$ and $\Delta 1_3$ are equal to 4. It will be noted that the transmission of the sequence $c_3$ occurs in the next superframe (not represented).

Figure 9:
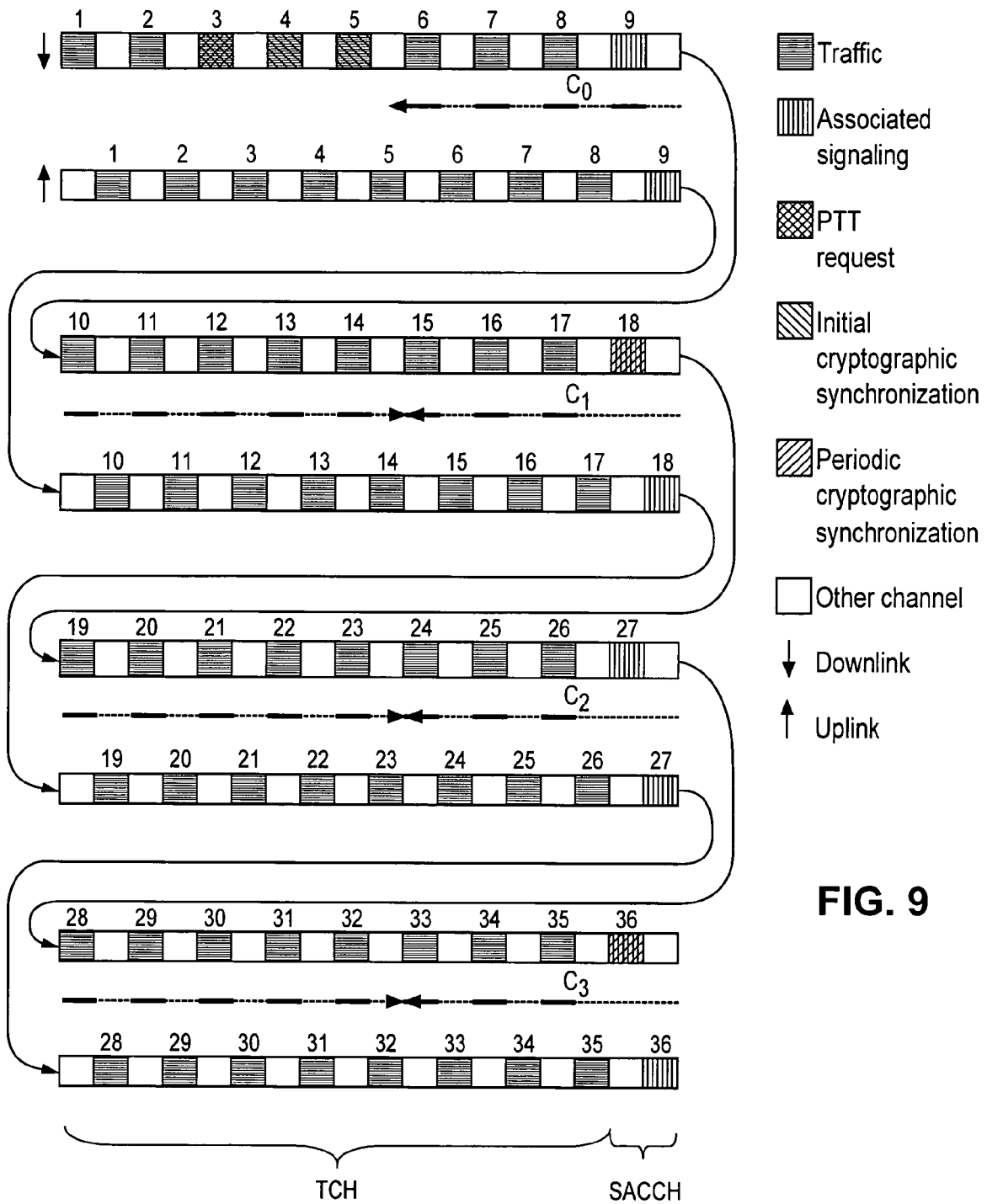
FIG. 9 is a chart illustrating an example of receiving four first sequences of encrypted data in a superframe of the radio channel for the PTT considered in FIG. 8.

In FIG. 9 is illustrated the reception of the same encrypted data sequences $c_0$, $c_1$, $c_2$ and $c_3$ by the receiver terminal in a determined superframe.

The encapsulation of the data in the superframe considered is managed by the base station. Having regard to the gap in radio synchronization between the cell of the sender terminal and that of the receiver terminal, it may happen, as is the case in the example represented, that there is a shift of time slot index numbers between the data received by the base station of the cell of the sender terminal and those transmitted by the base station of the cell of the receiver terminal.

In this example, indeed, the PTT request (granted) of the sender is received in the cell of the receiver in time slot 3. Likewise, the information cues $CSI_0$ are received in time slots 4 and 5. The sequences $c_0$, $c_1$, $c_2$ and $c_3$ are received on the basis, respectively, of time slots 6, 15, 24, and 33. However, the periodic synchronization information cue $CSI_1$ and the information cue relating to the corresponding time shift $\Delta 1_1$ are still received in the signaling time slot 18. Likewise, the periodic synchronization information cue $CSI_3$ and the information cue relating to the corresponding time shift $\Delta 1_3$ are still received in signaling time slot 36. This is why the value of the information cues $\Delta 1_1$ and $\Delta 1_3$ is modified by the fixed infrastructure so as to take account of the arrangement of the encrypted data sequences in the superframe in the cell of the receiver terminal. In this example, their value is changed from 4 to 3.

Figure 10:
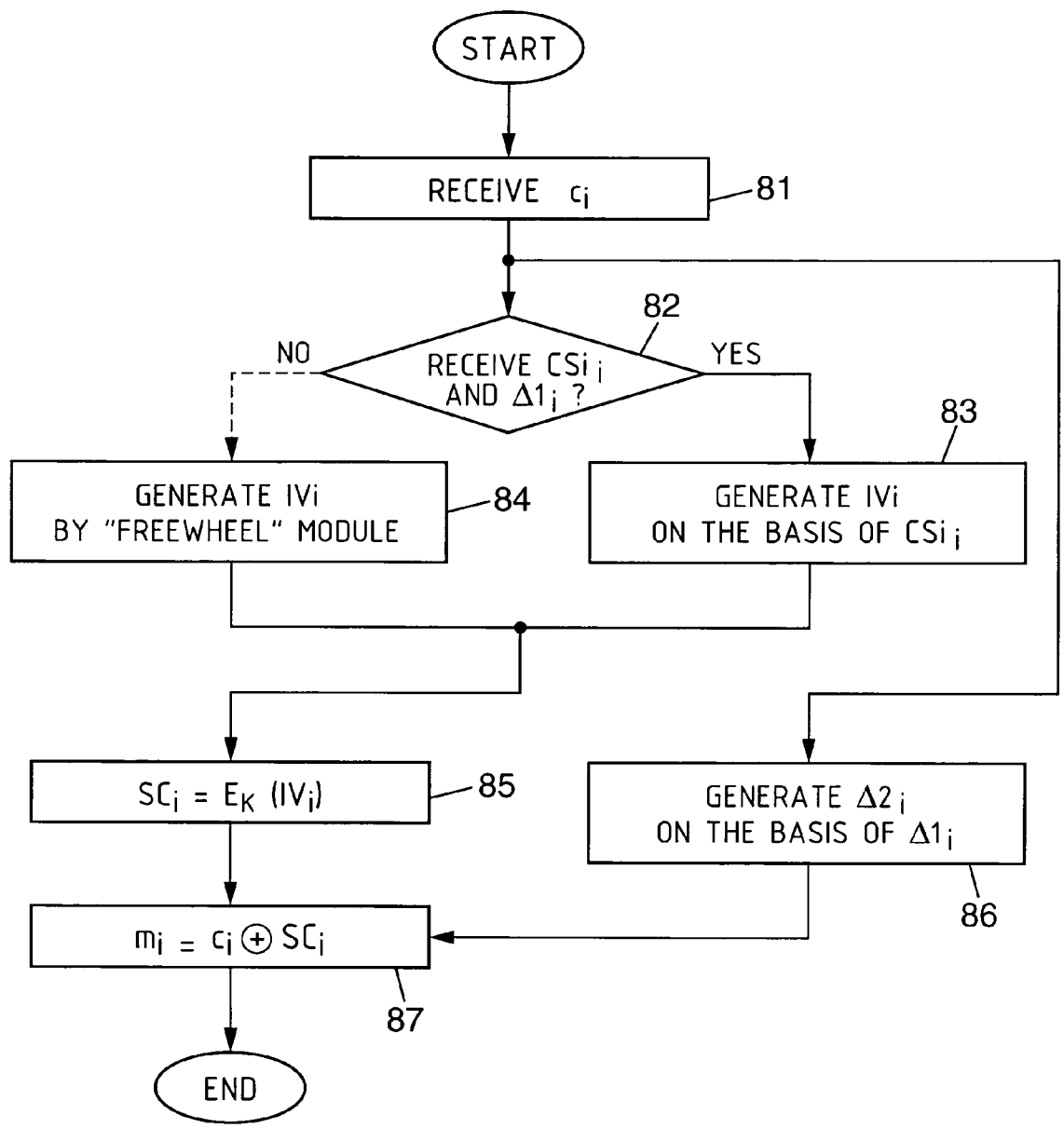
FIG. 10 is a chart illustrating an example of a sequence of steps of a process for decrypting encrypted data according to the invention.

The decryption of a sequence of encrypted data by the receiver terminal will now be described, in accordance with another aspect of the invention, with reference to the step chart of FIG. 10.

In a step 81, the receiver terminal receives a sequence of encrypted data $c_i$ in the traffic channel, on the basis of a determined time slot T, in a determined superframe. This sequence is delivered by the circuit 51 of the circuit 44 for processing the data received. If the sequence $c_i$ is received on the basis of one of the time slots 1, 10, 19 and 29, that is to say the first time slot of one of the four frames of said determined superframe, then a request is made, in a step 82, as to whether the synchronization information cue $CSI_i$ (and hence also the information cue $\Delta 1_i$) has been received in the previous signaling time slot S, namely, respectively time slot 36 of the previous superframe, slot 9, slot 18 or slot 27. If on the contrary the sequence $c_i$ is received on the basis of another of the traffic time slots T of the superframe, then, in step 82, a request is made as to whether the synchronization information cue $CSI_i$ (and hence also the information cue $\Delta 1_i$) has been received in the next signaling time slot S, namely one of the slots 9, 18, 27 and 36.

If the response to the question of the test 82 is yes, then, in a step 83, the unit 55 generates the current value $IV_i$ of the initialization vector on the basis of the value of the information cue $CSI_i$ received. To do this, we consider the Q3 LSB and the Q1 MSB of the value $CSI_i$ received, which respectively form the Q3 LSB and Q1 MSB of the value $IV_i$, on the one hand, and the Q2 MSB of the value of the time slot counter in the cell considered (that of the receiver terminal), which form the Q2 intermediate bits of the value $IV_i$, on the other hand. The reader may refer to the description above of FIGS. 6 and 7.

If on the contrary the response to this question is no, then, in a step 84, the current value $IV_i$ is generated by the "freewheel" module 67 of the unit 55. It will be noted that in reality the value $\Delta 1_i$ is constant for the whole of the duration of the PTT in progress, so that the terminal which is party to the communication can keep in memory the value received initially, that is to say at the start of the PTT, and disregard the values received subsequently during the same PTT.

It will be noted that the implementation of step 84 above is possible only for a receiver terminal which is already party to the communication, and not for a receiver terminal in the late entry phase. Such a terminal will have to wait for the actual receipt of the information cue $CSI_i$ (and hence also the information cue $\Delta 1_i$) to be able to begin to decrypt the encrypted data sequences received. This is why, in the figure, the path passing through the block symbolizing step 84 is represented dashed. It will be noted however that, according to the invention, the information cue $CSI_i$ not being transmitted by frame stealing, but in signaling time slots, the periodicity of the sending of this information cue may without any drawback be greater than in the prior art. The only constraint is the availability of resources in the associated signaling channel SACCH.

In a step 85, the generator 58 then generates the cryptographic sequence $SC_i$ on the basis of the initialization vector $IV_i$ current value produced in step 83 or in step 84, according to relation (1) given in the introduction. In parallel with steps 82 to 85, the unit 55 generates the information cue $\Delta 2_i$ on the basis of the current information cue $\Delta 1_i$. It will be noted that, just as for the information cue $\Delta 1_i$ (see paragraph above), the value of the information cue $\Delta 2_i$ is constant for the whole duration of the PTT in progress. Step 85 can therefore be executed by a receiver terminal only once at the start of the PTT, or upon late entry into the communication, as the case may be. Next, the value $\Delta 2_i$ can be held in memory until the start of the next PTT.

The generation of the information cue $\Delta 2_i$ on the basis of the information cue $\Delta 1_i$ is tantamount to converting the information cue $\Delta 1_i$ expressed as a number of time slots into a corresponding information cue $\Delta 2_i$ expressed as a number of speech packets. This conversion can be performed with the aid of a table of values stored in memory, which is illustrated by the array of FIG. 11. This array is understood by considering the chart and the array of FIGS. 3a and 3b respectively.

In a step 87, the Exlusive-OR operator 56 restores the plaintexttext data sequence $m_i$ on the basis of the encrypted data sequence $c_i$ and of the cryptographic sequence $SC_i$, according to relation (3) given in the introduction, and as a function moreover of the information cue $\Delta 2_i$. More exactly, the sequence $SC_i$ is combined with the sequence $c_i$ after rightward shifting of its bits by a number of bits equal to $\Delta 2_i \times N/P$, where it is recalled that N designates the length as a number of bits of the sequence $SC_i$, and P designates the number of speech frames in a TDMA frame. This is achieved simply by means of a pointer in the shift register 57, which is shifted by $\Delta 2_i \times N/P$ ranks in the register. As a result of this shift, for a terminal entering into the communication late, while a PTT is in progress, the speech packets of the sequence $c_i$ which have been received before the time slot S in which the information cue $CS_i$ and the information cue $\Delta 1_i$ are received for the first time, are not decrypted. It will be noted that all the encrypted data sequences received subsequently are nevertheless decrypted in their entirety.

Figure 12:
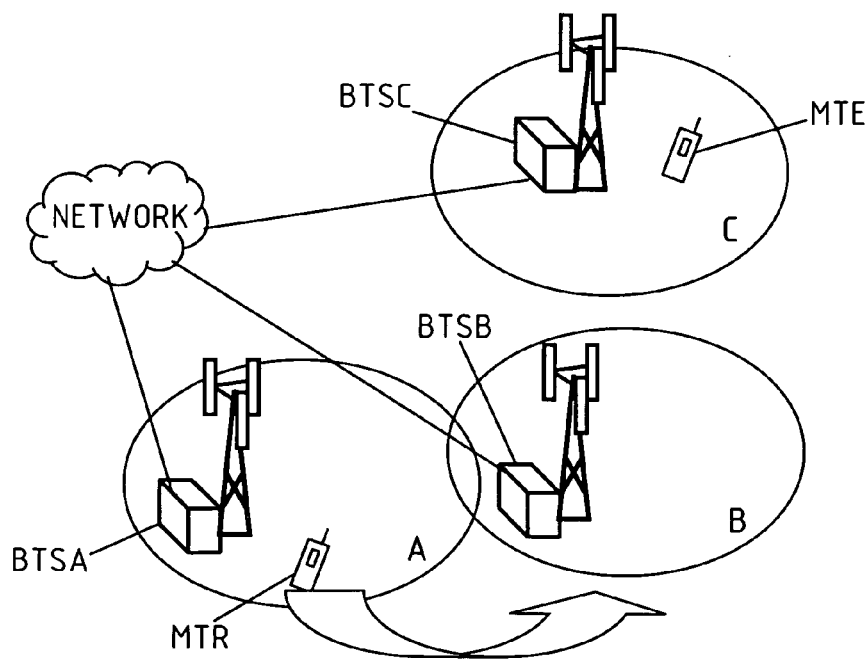
FIG. 12 is a diagram showing a handover configuration in a radiocommunications system.

FIG. 12 illustrates a change of cell configuration ("handover") relating to a receiver mobile terminal MTR which is communicating with a sender mobile terminal MTE. It is assumed that the terminal MTR is located in a cell A (origin cell) and is heading toward another cell B (target cell), and that the terminal MTE is located in a third cell C. Each of the cells A, B and C is covered, from the radio point of view, by a base station BTSA, BTSB and BTSC respectively. These base stations are linked to the network of the fixed infrastructure of the cellular radiocommunications system.

With reference to the configuration of FIG. 12, a solution will now be presented for maintaining the cryptographic synchronization upon handover of a receiver terminal in the course of an end-to-end encrypted communication.

During the handover of the MTR terminal from cell A to cell B, a technique according to the conventional prior art would consist in providing the MTR terminal, in the change of cell command transmitted on the associated signaling channel, with only the purely radio information cues allowing it to synchronize itself from a radio point of view with the desired channel in cell B. Once in cell B, the terminal would have to wait for the receipt of the cryptographic synchronization information cues transmitted by the technique described previously to carry out cryptographic synchronization. Until the receipt of this information cue, the MTR terminal may be unable to decrypt the data received, so that the communication would be cut, even though the handover has already been carried out successfully. This technique therefore gives rise to late cryptographic synchronization, on account of this wait for the cryptographic synchronization information cue on the traffic channel in the target cell, and hence through a cutting of the communication which is much longer than that due to the actual handover.

In an embodiment of the invention, use is again made of the counters of time slots in the source cell and in the target cell to solve this problem. It should be noted here that the time slot counter takes account of the elementary time slots, and not the composite time slots of the frame structure. Consequently, the number of time slots in question here is, unless mentioned to the contrary, to be considered with reference to the number of elementary time slots, that is to say by taking account of the time slots on both the uplink and the downlink. For example, the length of a TDMA frame thus corresponds to 72 units (36×2) of the time slot counter of the cell considered.

In substance, in the change of cell command transmitted on the associated signaling channel of cell A, the base station BTSA provides the terminal MTR with, in addition to the information cues of a radio nature allowing it to synchronize itself with the desired channel in cell B, an information cue relating to the cryptographic synchronization shift between the source cell and the target cell, which is obtained in the way which will now be set forth. This information cue is expressed as the gap $\Delta_{CPT}$ between the respective time slot counters of the source cell and of the target cell.

The base station BTSB of cell B begins to receive from the network, during a transient phase of the change of cell procedure, encrypted speech packets which are intended to be sent over the downlink of the channel which will carry the communication in cell B between itself and the terminal MTR (hereinafter the target channel). These speech packets carry a time stamp inserted by the network to allow verification of the proper sequencing and absence of loss thereof. It is necessary by reason of the fact that the time required to transfer the speech packets through the network may vary from one packet to another, and that, moreover, certain packets may be lost during transmission through the network. This time stamp is naturally synchronized with the value of the time slot counter of cell A.

The station BTSB then retransmits to the base station BTSA of cell A an information cue composed of the value of the time slot counter in cell B corresponding to the transmission over the target channel of a determined speech packet, having been received from the network, on the one hand, and the corresponding time stamp carried by said speech packet received, on the other hand.

On the basis of this information cue, the base station BTSA of the source cell can easily calculate the cryptographic synchronization shift between the two base stations by comparing the value received with the value $CA_i$ of its own time slot counter corresponding to the send time slot of the speech packet considered (that is to say corresponding to a given time stamp). It then transmits a cryptographic synchronization shift information cue to the terminal MTR in the change of cell command. One possible convention is to transmit the difference $\Delta_{CPT}$ between the values $CB_i$ and $CA_i$, respectively of the time slot index number counter in the target cell B and of the time slot index number counter in the source cell A, corresponding for example to the start of the same cryptographic sequence, that is to say to the time slot S inside which a cryptographic synchronization information cue $CSI_i$ has been or could have been transmitted thereto.

This difference $\Delta_{CPT}$ is easy to obtain as a function of the information cues transmitted by the base station BTSB of the target cell to the base station BTSA of the source cell, as indicated above. Stated otherwise, if the change of cell command is transmitted in the course of the signaling time slot for which the time slot counter in the source cell A equals $CA_i$, corresponding to the time slot inside which the cryptographic synchronization information cue $CSI_i$ would have been transmitted for a determined cryptographic sequence $SC_i$, the value of the cryptographic synchronization shift information cue $\Delta_{CPT}$ transmitted with the change of cell command is then equal to $CB_i\text{-}CA_i$, where $CB_i$ is the value of the time slot counter in the target cell B at the start of the same cryptographic sequence $SC_i$.

The terminal MTR knows, by polling the neighboring cells and in particular the target cell B, the value of the time slot counter in each of these cells. It is then capable of determining, by virtue of the use of the "freewheel" algorithm, the value of the cryptographic synchronization information cue $CS_i$ to be used for the decryption of an encrypted data sequence $c_i$ received via the target channel (i.e., the channel allocated to communication in cell B), and the temporal position of the start of the cryptographic sequence to which this value corresponds (and which is normally determined through the information cue which is denoted $\Delta 1_1$ in the foregoing). It may then synchronize itself immediately not only from the radio point of view, but also from the point of view of end-to-end cryptography, doing so without waiting for the actual receipt of a cryptographic synchronization information cue $CSI_i$. Any additional cutting of communication prejudicial to the quality of service is thus avoided.

Figure 13:
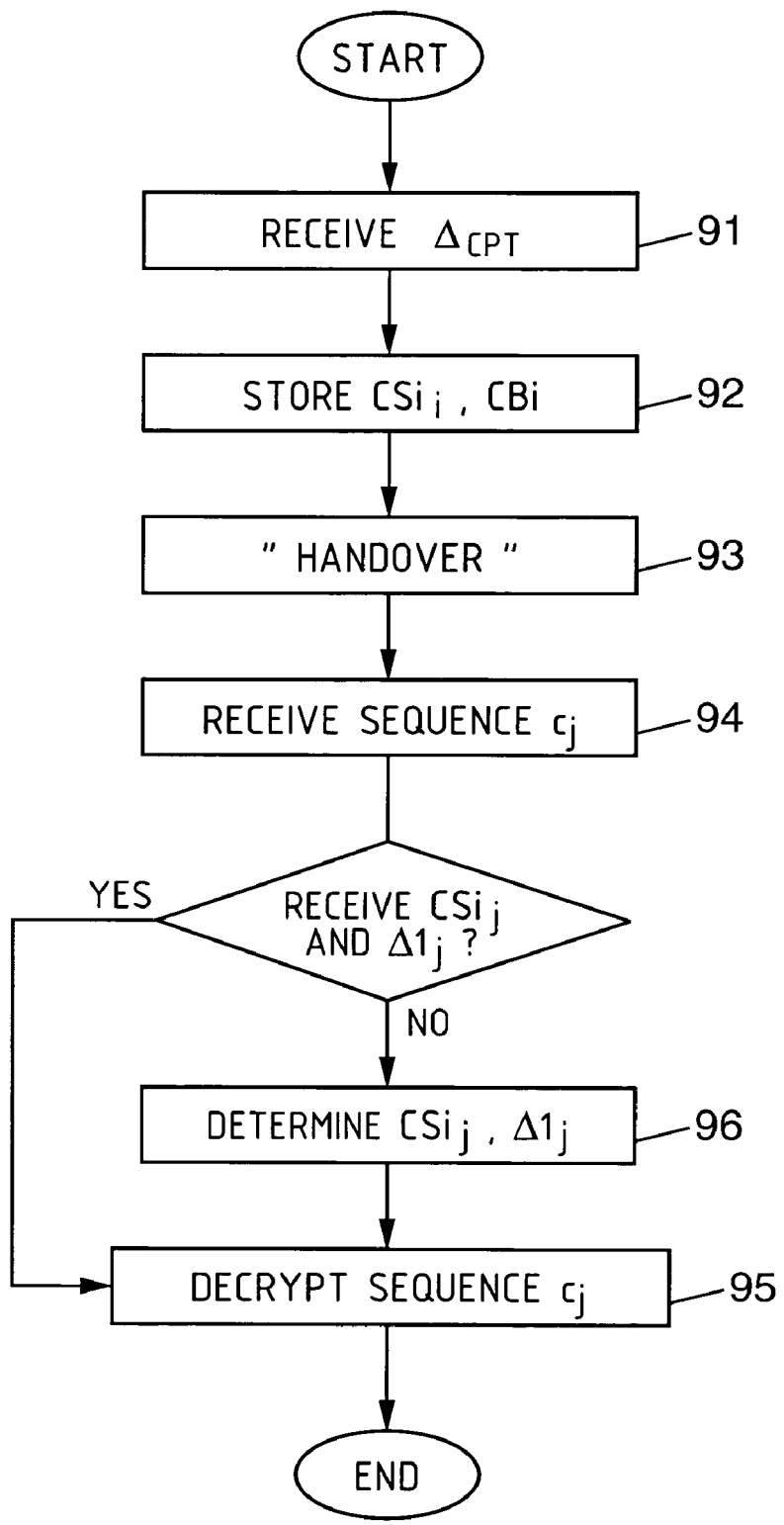
FIG. 13 is a chart illustrating an example of a sequence of steps according to the invention, for maintaining cryptographic synchronization upon a handover.

The chart of FIG. 13 illustrates a sequence of steps of an algorithm making it possible to maintain cryptographic synchronization for the terminal MTR between cells A and B.

Before leaving cell A, the terminal MTR receives, in a step 91, a cryptographic synchronization shift information cue $\Delta_{CPT}$, relating to the cryptographic synchronization shift between the source cell A and the target cell B. This information cue $\Delta_{CPT}$ is calculated by the base station BTSA of cell A as was stated above. In an example, the information cue $\Delta_{CPT}$ is transmitted by the base station BTSA to the terminal MTR with the change of cell command in a determined time slot S on the transmission channel allocated to communication in cell A.

In a step 92, the terminal MTR stores the value of a first determined cryptographic synchronization information cue $CSI_i$, which may quite simply be the current value of the cryptographic synchronization information cue at the moment at which the change of cell command is received. It also stores the value $CB_i$ of the time slot counter of the source cell B corresponding to the time slot S in which the information cue $CSI_i$ has been received (in the case where it is a value which has actually been received) or could have been received (in the case where it is a value which has been generated by means of the "freewheel" algorithm). This value $CB_i$ is obtained by adding the value $\Delta_{CPT}$ to the value $CA_i$, that is to say by computing $CB_i = CA_i + \Delta_{CPT}$.

In a step 93, the terminal MTR performs the change of cell. Consequently, it passes from the transmission channel allocated to communication in cell A to the transmission channel allocated to communication in cell B.

In a step 94, it receives a determined sequence of encrypted data packets $c_j$, inside a determined time slot T on the transmission channel allocated to communication in cell B. This is the first sequence of encrypted data packets which it receives after its transfer to cell B.

If the terminal MTR also receives the value of the cryptographic synchronization information cue $CSI_j$ to be used for the decryption of the sequence $c_j$ (and consequently, also the value of the corresponding associated cryptographic synchronization delay information cue $\Delta 1_j$), then, in a step 95, it performs the decryption of the sequence $c_j$ on the basis of the values $CSI_j$ and $\Delta 1_j$ received. This decryption takes place in the manner previously indicated (with reference to the chart of steps of FIG. 10). Such a case is that, for example, of the sequence $c_1$ or of sequence $c_3$ in FIG. 9.

In the absence of reception of the values $CSI_j$ and $\Delta 1_j$, the terminal MTR determines, in a step 96, the value $CSI_j$ as well as the value $\Delta 1_j$, on the basis of the value $CB_i$ of the time slot counter in the source cell and of the value of cryptographic synchronization information cue $CSI_i$, which it stored in step 92, and on the basis moreover of the value $CB_j$ of the time slot counter corresponding to the time slot S in which the cryptographic synchronization information cue $CSI_j$ could have been received on the transmission channel allocated to communication in cell B. Such a case is that, for example, of the sequence $c_2$ in FIG. 9, the time slot S in which the cryptographic synchronization information cue $CSI_2$ could have been received being slot 27 in this figure. The terminal then jumps to step 95, in which it performs the decryption of the sequence $c_j$ on the basis of the values $CSI_j$ and $\Delta 1_j$ that it has thus determined.

An example of the detailed operations that are performed during the determination step 96 is given hereinafter.

On arriving in cell B, the terminal MTR determines the value $CB_j$ of the time slot counter in cell B, which corresponds to the time slot wherein the cryptographic synchronization information cue $CSI_j$ would have been sent before its arrival in cell B.

The terminal MTR then calculates the difference $\Delta_{CPT}'=CB_j-CB$; which may be positive (which signifies that the cryptographic sequence $SC_j$ began in the past) or negative (which signifies that the cryptographic sequence $SC_j$ will begin in the future).

The terminal then performs the Euclidian division of $\Delta_{CPT}'$ by the number 2×P of (elementary) time slots separating two signaling time slots S in the frame structure, and which corresponds also to the length of a cryptographic sequence. It is recalled that, in the example considered here, 2×P is equal to 72. The divisor is called $\Delta_s$ and the remainder is called $\Delta_{IT}$ in what follows. Stated otherwise, we have the relation:

$$\Delta_{CPT}'=\Delta_s \times (2 \times P)+\Delta_{IT} \quad (5)$$

The terminal MTR then runs the "freewheel" algorithm of the module 67 of the unit 55 a number of times equal to $\Delta_s$ (by applying the algorithm $\Delta_s$ times if $\Delta_s$ is positive, or the inverse algorithm a number of times equal to $abs(\Delta_s)$ if $\Delta_s$ is negative). The result gives a new value of the initialization vector $IV_j$ which allows the generator 58 to generate a new cryptographic synchronization information cue $SC_j$.

The remainder $\Delta_{IT}$ (counted as elementary time slots) is divided by two to obtain the shift, in terms of composite time slots, corresponding to the number of (elementary) time slots on the one downlink of the transmission channel (in the case of a TDMA system of order 2 corresponding to the example considered here). This value $\Delta_{IT}/2$ is the value of the cryptographic synchronization delay information cue $\Delta 1_j$ corresponding to the cryptographic sequence $SC_j$.

Stated otherwise, the terminal synchronizes itself from the cryptography point of view on the basis of the cryptographic synchronization information cue $CSI_j$ and of the cryptographic synchronization delay information cue $\Delta 1_j = \Delta_{IT}/2$, thus obtained, had been received in a manner associated with the sequence of encrypted data packets $c_j$. There is therefore no delay due to cryptographic synchronization in re-establishing communication in the target cell B.

The invention claimed is:

1. A method for transmitting encrypted data between a sender mobile terminal and at least one receiver mobile terminal of a digital radiocommunication system, through a radio transmission channel having a frame structure such that a TDMA frame comprises time slots of a first type forming a traffic channel for the transmission of traffic information and at least one time slot of a second type forming an associated signaling channel for the transmission of signaling information, wherein a sequence of encrypted data packets is transmitted in the traffic channel starting from a determined time slot of the first type whereas an associated cryptographic synchronization information cue is periodically transmitted in the associated signaling channel inside a determined time slot of the second type which is timely separated from said time slot of the first type by an undetermined time gap, and wherein a cryptographic synchronization delay information cue relating to said time gap is also periodically transmitted in the associated signaling channel.

2. The transmission method of claim 1, wherein the value of the cryptographic synchronization information cue is derived from the value of an initialization vector having served to generate a cryptographic sequence used for the encryption of the sequence of encrypted data packets.

3. The transmission method of claim 2, wherein the length of the cryptographic sequence is equal to a determined number N of bits, which corresponds to the number of useful bits transmitted between two consecutive time slots of the second type in which a cryptographic synchronization information cue may be transmitted.

4. The transmission method of claim 3, wherein N is multiple of a determined number M which corresponds to the number of bits of an encrypted data packet.

5. The transmission method of claim 1, wherein the cryptographic synchronization delay information cue is the number of time slots of the first type separating the determined time slot of the first type and the determined time slot or the second type.

6. The transmission method of claim 1, wherein the cryptographic synchronization delay information cue is transmitted inside the determined time slot of the second type with the cryptographic synchronization information cue.

7. The transmission method of claim 1, wherein the determined time slot of the second type is the time slot of the second type coming in the frame structure immediately before, or the first time slot of the second type coining in the frame structure after the determined time slot of the first type.

8. The transmission method as claimed in claim 1, wherein the value of the cryptographic synchronization information cue is initialized, at the start of PIT, to a determined value coded on a determined number Q of bits, and obtained as the binary concatenation of a determined number Q1 of first bits coding a random value on the one hand, and of a determined number Q2 of second bits which are the least significant bits of the value of a time slot counter on the other hand, where Q, Q1 and Q2 are determined integers.

9. A method for decrypting a sequence of encrypted data packets transmitted between a sender mobile terminal and at least one receiver mobile terminal of a digital radiocommunication system, through a radio transmission channel having a frame structure such that a TDMA frame comprises time slots of a first type forming a traffic channel for the transmission of traffic information and at least one time slot of a second type forming an associated signaling channel for the transmission of signaling information, comprising the steps of: receiving said sequence of encrypted data packets starting from a determined time slot of the first type; optionally, periodically receiving an associated cryptographic synchronization information cue in the associated signaling channel, inside a determined time slot of the second type which is timely separated from said time slot of the first type by an undetermined time gap, and, in this case, also periodically receiving, in the associated signaling channel, a cryptographic synchronization delay information cue relating to said time gap; generating a value of an initialization vector having served to generate a cryptographic sequence used for the encryption of said sequence of encrypted data packets: generating the same cryptographic sequence, on the basis of the initialization vector value generated in; said step of generating a value of an initialization vector; shifting the cryptographic sequence generated in said step of generating the same cryptographic sequence as a function of said cryptographic synchronization delay information cue; and decrypting said sequence of encrypted data packets on the basis of said shifted cryptographic sequence.

10. The decryption method of claim 9, wherein, the value of the initialization vector is derived from the value of the received cryptographic synchronization information cue.

11. The decryption method of claim 9, wherein, in the absence of receipt of the value of the cryptographic synchronization information cue, the value of the initialization vector is generated with the aid of a "freewheel" algorithm on the basis of an earlier value of the cryptographic synchronization information cue.

12. The decryption method of claim 9, wherein, the cryptographic synchronization delay information cue being expressed as a number of time slots, the step of shifting the cryptographic sequence comprises the generation of a corresponding information cue expressed as a number of data packets.

13. The decryption method of claim 9, wherein, upon a change of cell of the receiver mobile terminal, from a determined source cell to a determined target cell, the receiver mobile terminal: receives a cryptographic synchronization shift information cue, relating to the cryptographic synchronization shift between the source cell and the target cell, which is transmitted with the change of cell command in a determined time slot of the second type over the transmission channel allocated to the communication in the source cell; stores the value of a first determined cryptographic synchronization information cue and a first value of the target cell's time slot counter corresponding to the time slot of the second type in which said cryptographic synchronization information cue could have been received; performs the change of cell; receives a determined sequence of encrypted data packets, starting from a determined time slot of the first type over the transmission channel allocated to the communication in the target cell; and, in the absence of receipt of the value of a second cryptographic synchronization information cue, to be used for the decryption of said sequence of encrypted data packets, determines the value of said second cryptographic synchronization information cue, as well as the value of the corresponding associated cryptographic synchronization delay information cue, on the basis of said first value of the counter of time slots in the target cell, of the value of said first cryptographic synchronization information cue, and furthermore of a second value of the counter of time slots in the target cell corresponding to the time slot of the second type in which said second cryptographic synchronization information cue could have been received over the transmission channel allocated to the communication in the target cell.

14. A device for transmitting encrypted data between a sender mobile terminal and at least one receiver mobile terminal of a digital radiocommunication system, through a radio transmission channel having a frame structure such that a TDMA frame comprises time slots of a first type forming a traffic channel for the transmission of traffic information and at least one time slot of a second type forming an associated signaling channel for the transmission of signaling information, comprising: means for transmitting a sequence of encrypted data packets in the traffic channel starting from a determined time slot of the first type, and for periodically transmitting an associated cryptographic synchronization information cue in the associated signaling channel inside a determined time slot of the second type which is timely separated from said time slot of the first type by an undetermined time gap, and means for also periodically transmitting in the associated signaling channel, a cryptographic synchronization delay information cue relating to said time gap.

15. The transmission device of claim 14, further comprising means for deriving the value of the cryptographic synchronization information cue from the value of an initialization vector having served to generate a cryptographic sequence used for the encryption of said sequence of encrypted data packets.

16. The transmission device of claim 15, wherein the length of the cryptographic sequence is equal to a determined number N of bits, which corresponds to the number of useful bits transmitted between two consecutive time slots of the second type in which a cryptographic synchronization information cue may be transmitted.

17. The transmission device of claim 16, wherein the number N is multiple of a determined integer number M which corresponds to the number of bits of an encrypted data packet.

18. The transmission device of claim 14, wherein the cryptographic synchronization delay information cue is the number of time slots of the first type separating the determined time slot of the first typo and the determined time slot of the second type.

19. The transmission device of claim 14, wherein the cryptographic synchronization delay information cue is transmitted inside the determined time slot of the second type with the cryptographic synchronization in formation cue.

20. The transmission device of claim 14, wherein the determined time slot of the second type is the time slot of the second type coming in the frame structure immediately before, or the first time slot of the second type coming in the frame structure after the determined time slot of the first type.

21. The transmission device of claim 14, further comprising means for, at the start of PTT, initializing the value of the cryptographic synchronization information cue to a determined value coded on a determined number Q of bits, and obtained as the binary concatenation of a determined number Q1 of first bits coding a random value on the one hand, and of a determined number Q2 of second bits which are the least significant bits of the value of a time slot counter on the other hand, where Q, Q1 and Q2 are determined integers.

22. A device for decrypting a sequence of encrypted data packets transmitted between a sender mobile terminal and at least one receiver mobile terminal of a digital radiocommunication system, through a radio transmission channel having a frame structure such that a TDMA frame comprises time slots of a first type forming a traffic channel for the transmission of traffic information and at least one time slot of a second type forming an associated signaling channel for the transmission of signaling information, comprising: first means of reception for receiving said sequence of encrypted data packets starting from a determined time slot of the first type; second means of reception for, optionally, periodically receiving an associated cryptographic synchronization information cue in the associated signaling channel, inside a determined time slot of the second type which is timely separated from said time slot of the first type by an undetermined time gap, and, in this case, means of reception for also periodically receiving, in the associated signaling channel, a cryptographic synchronization delay information cue relating to said time gap; first means of generation for generating a value of an initialization vector having served to generate a cryptographic sequence used for the encryption of said sequence of encrypted data packets; second means of generation, for generating the same cryptographic sequence on the basis of the initialization vector value generated by said first means of generation; means of shifting for shifting the cryptographic sequence generated by said second means of generation, as a function of said cryptographic synchronization delay information cue; and means for decrypting said sequence of encrypted data packets on the basis of said shifted cryptographic sequence.

23. The decryption device of claim 22, wherein the first means of generation comprise means for deriving the value of the initialization vector from the value of the cryptographic synchronization information cue received by the means of reception.

24. The decryption device of claim 22, wherein, in the absence of receipt of the value of the cryptographic synchronization information cue by said first means of reception, said first means of generation comprise means for generating the value of the initialization vector with the aid of a "freewheel" algorithm on the basis of an earlier value or the cryptographic synchronization information cue.

25. The decryption device of claim 22, wherein, the cryptographic synchronization delay information cue being expressed as a number of time slots, said means of shifting comprise means for generating a corresponding information cue expressed as a number of data packets.

26. The decryption device of claim 22. further comprising means for, upon a change of cell of the receiver mobile terminal from a determined source cell to a determined target cell: receiving a cryptographic synchronization shift information cue, relating to the cryptographic synchronization shift between the source cell and the target cell, which is transmitted with the change of cell command in a determined time slot of the second type over the transmission channel allocated to the communication in the source cell; storing the value of a first determined cryptographic synchronization information cue and a first value of the target cell's time slot counter corresponding to the time slot of the second type in which the cryptographic synchronization information cue could have been received; performing the change of cell; receiving a determined sequence of encrypted data packets, starting from a determined time slot of the first type over the transmission channel allocated to the communication in the target cell; and, in the absence of receipt by said first means of reception of the value of a second cryptographic synchronization information cue, to be used for the decryption of the sequence of encrypted data packets, determining the value of the second cryptographic synchronization information cue, as well as the value of the corresponding associated cryptographic synchronization delay information cue, on the basis of the first value of the counter of time slots in the target cell, of the value of the first cryptographic synchronization information cue, and furthermore of a second value of the counter of time slots in the target cell corresponding to the time slot of the second type in which the second cryptographic synchronization information cue could have been received over the transmission channel allocated to the communication in the target cell.

27. A mobile terminal of a digital radiocommunication system, including a transmission device as claimed in claim 14.

28. A mobile terminal of a digital radiocommunication system. including a decryption device as claimed in claim 22.

29. A mobile terminal of a digital radiocommunication system of claim 27 including a decryption device for decrypting a sequence of encrypted data packets transmitted between a sender mobile terminal and at least one receiver mobile terminal of a digital radiocommunication system, trough a radio transmission channel having a frame structure such that a TDMA frame comprises time slots of a first type forming a traffic channel for the transmission of traffic information and at least one time slot of a second type forming an associated signaling channel for the transmission of signaling information, comprising: first moans of reception for receiving said sequence of encrypted data packets starting from a determined time slot of the first type; second means of reception for, optionally, receiving an associated cryptographic synchronization information cue in the associated signaling channel, inside a determined time slot of the second type which is timely separated from said time slot of the first type by an undetermined time gap, and, in this case, means of reception for also receiving, in the associated signaling channel, a cryptographic synchronization delay information cue relating to said time gap; first means of generation for generating a value of an initialization vector having served to generate a cryptographic sequence used for the encryption of said sequence of encrypted data packets; second means of generation, for generating the same cryptographic sequence, on the basis of the initialization vector value generated by said first means of generation; means of shifting for shifting the cryptographic sequence generated by said second means of generation, as a function of said cryptographic synchronization delay information cue; and means for decrypting said sequence of encrypted data packets on the basis of said shifted cryptographic sequence.

* * * * *